Sept. 14, 1948.   A. PARTIN   2,449,315
ADJUSTABLE DRAW BAR FOR TRAILER COUPLINGS
Filed April 8, 1947   2 Sheets-Sheet 1

Inventor
Albert Partin

By Clarence A. O'Brien
and Harvey B. Jacobson
Attorneys

Sept. 14, 1948.　　　　　A. PARTIN　　　　　2,449,315
ADJUSTABLE DRAW BAR FOR TRAILER COUPLINGS
Filed April 8, 1947　　　　　　　　　　　　2 Sheets-Sheet 2

Inventor
Albert Partin

By *Clarence A. O'Brien*
*and Harvey B. Jacobson*
Attorneys

Patented Sept. 14, 1948

2,449,315

UNITED STATES PATENT OFFICE 2,449,315

ADJUSTABLE DRAWBAR FOR TRAILER COUPLINGS

Albert Partin, Portales, N. Mex.

Application April 8, 1947, Serial No. 740,081

1 Claim. (Cl. 280—33.44)

This invention relates to a draw bar for a trailer coupling and has for its primary object to connect the axles of a traction vehicle to a trailer in order to exert direct pull thereon by the tractive force of the traction vehicle.

Another object is to relieve the springs and chassis of the traction vehicle from the effects of the pull of a trailer and also to support the weight of the trailer directly on the axles of the traction vehicle.

The above and other objects may be attained by employing this invention which embodies among its features a longitudinally and laterally adjustable frame adapted to be fixed to the front and rear axles of a traction vehicle beneath the chassis thereof, a tow bar mounted on the frame at its rear end and a trailer coupling fixed to the tow bar intermediate its ends.

Other features include attaching means by which the frame may be easily and quickly coupled to the front and rear axles of the traction vehicle.

Figure 1:
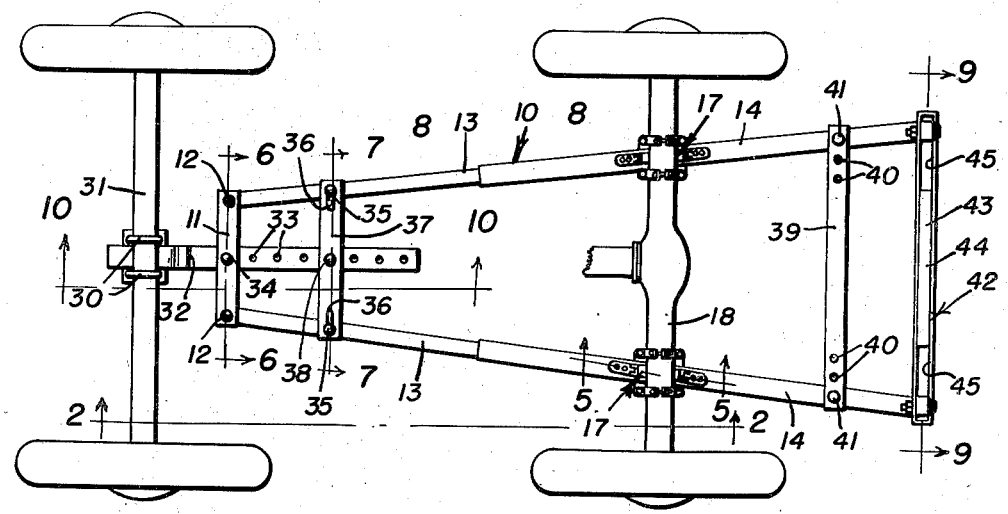
Figure 1 is a plan view of the front and rear axles of a traction vehicle showing this improved frame coupled thereto.
Figure 2:
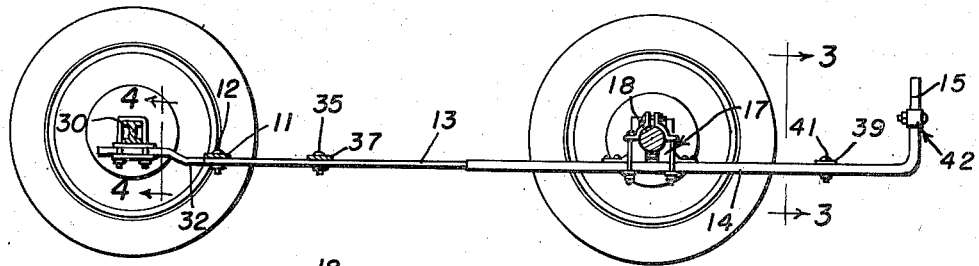
Figure 2 is a longitudinal sectional view taken substantially along the line 2—2 of Figure 1.
Figures 3, 4:
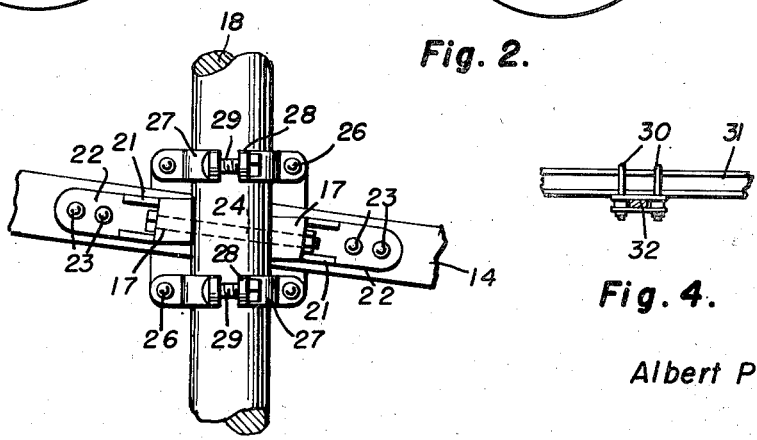
Figure 3 is a rear end view of the vehicle axles showing the draw bar in place thereon.
Figure 4 is a front end view of the device.
Figure 8:
Figure 8 is an enlarged fragmentary sectional view taken substantially along the line 8—8 of Figure 1.
Figure 7:
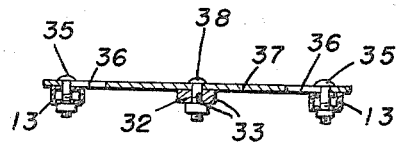
Figure 7 is a transverse sectional view taken substantially along the line 7—7 of Figure 1.
Figure 9:
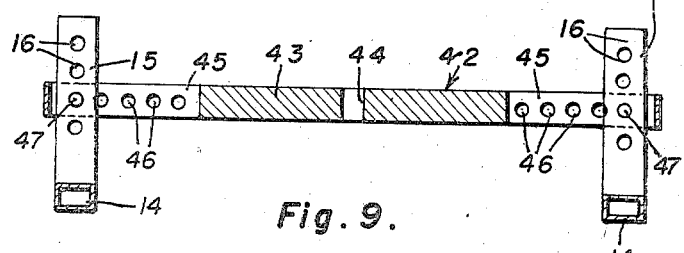
Figure 9 is an enlarged transverse sectional view taken substantially along the line 9—9 of Figure 1.
Figure 10:
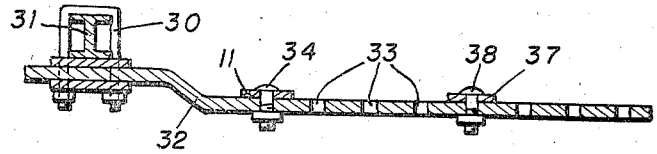
Figure 10 is an enlarged fragmentary sectional view taken substantially along the line 10—10 of Figure 1.

Referring to the drawings in detail this improved draw bar designated generally 10 comprises a cross bar 11 to which is pivoted adjacent each end, as at 12, the forward end of a telescopic side bar 13. Each side bar 13 comprises a tubular member 14 into the forward end of which the forward portion of the bar telescopes as will be readily understood upon reference to Figures 1, 2 and 8. Formed at the rear end of each tubular portion 14 of the side bars is an upwardly projecting vertical arm 15 each of which is provided with a vertical row of spaced openings 16 the purpose of which will be more fully hereinafter explained.

Figure 5:
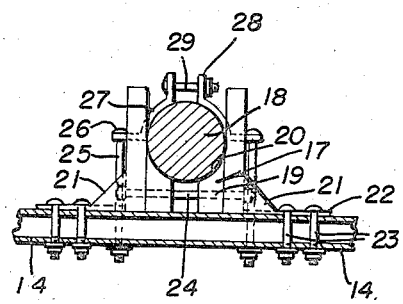
Figure 5 is a fragmentary enlarged sectional view taken substantially along the line 5—5 of Figure 1.
Figure 6:
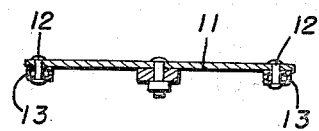
Figure 6 is an enlarged sectional view taken substantially along the line 6—6 of Figure 1.

Each tubular portion 14 of each side bar is provided on its upper side intermediate its ends with a saddle 17 into which the axle housing 18 of the rear axle of the vehicle is adapted to fit. Each saddle member 17 comprises a pair of spaced parallel jaws 19 provided with curved surfaces 20 to conform to the curvature of the axle housing 18, and formed at the lower end of each jaw 19 is a foot 21 which is adapted to rest on the top surface of its respective tubular portion 14 of a side bar. Opening through the end of each foot 21 remote from its respective jaw member 19 is a longitudinal slot 23 for the reception of clamping bolts 23' which are projected through spaced openings in the tubular members to which the saddle 17 is attached. The bolt 24 projects through the jaw member 19 in spaced parallel relation to the feet 21 thereof, and by turning the nut on the bolt the jaw members may be advanced toward one another in order securely to clamp the axle housing 18 in place. Projecting laterally from each jaw member 19, on each side thereof is a shoulder 25 provided in its upper end with an internally screw threaded bolt receiving opening for the reception of an attaching bolt 26 for a clamp member 27. As illustrated in Figure 5 the upper end of each clamp member 27 is provided with an upwardly extending ear 28 for the reception of a tie bolt 29 which serves to draw the upper ends of the clamp members 27 together in order tightly to clamp the axle housing in the saddle.

Attached, as by inverted U-bolts 30, to the front axle 31 of the traction vehicle is a rearwardly extending tongue 32 which is provided with a longitudinally extending row of spaced openings 33 for the reception of a coupling bolt 34 which is projected through the cross bar 11 midway between opposite ends, and through one of the openings 33 in order to effect a coupling between the forward end of the draw bar 10 and the front axle 31. Carried by the forward end 13 of each side bar is an upwardly extending pivot pin 35 which projects upwardly through a longitudinal slot 36 formed adjacent each end of a stabilizing bar 37, which extends transversely between side bars of the frame 10 and is provided midway between opposite ends with an opening for the reception of an attaching bolt 38 which is projected through one of the openings 33 to the rear of the cross bar 11 as will be readily understood upon reference to Figure 1. Extending transversely between the rear tubular portions 14 of the side bars is a spreader bar 39 which is provided adjacent each end with a longitudinal row of spaced openings 40 for the reception of coupling bolts 41 which are projected through the rear tubular portions 14 of the side bars near their rear ends, and through a selected opening 40 so as to hold the side bars in various adjusted positions.

A tow bar designated generally 42 comprises an elongated solid body 43 provided intermediate its ends with an opening 44 through which is coupled one element of a conventional trailer coupling. Formed in the body 43 adjacent each end is a longitudinal slot 45 for the reception of the upwardly extending arm 15 previously described. Formed in each side wall of each slot 45 is a longitudinal row of spaced aligning openings 46 for the reception of bolts 47 which are adapted to be projected through the openings 16 and the openings 46 in order adjustably to hold the tow bar in proper position on the arms 15.

In use, the tongue 32 is coupled to the front axle 31 by means of the U-bolts 30 and the cross bar 11 is then connected at the desired point to the tongue by projecting the bolts 34 through a selected opening 33. The stabilizer bar is then coupled to the tongue by projecting the bolt 38 through the opening midway between opposite ends thereof and through a selected opening in the tongue 32 after which the side bars are adjusted laterally to the desired position and longitudinally to place the saddles 17 into proper position about the rear axle housing 18. The saddles are clamped into proper position on the axle housing 18 by turning the nuts on the bolts 24 after which the clamp members 27 are tightened into place securely to grip the axle housing 18 and suspend the frame 10 between the axles 31 and 18. The spreader bar is then coupled in place by projecting the bolts 41 through selected openings 40 and securely clamping the parts together. After thus having suspended the frame on the axles, the tow bar 42 is mounted on the upstanding arms 15 and the bolts 47 are passed through selected openings 16 and 46 properly to hold the tow bar in place. In this position the device is ready to have a trailer connected thereto, and direct pull will be exerted on the trailer from the axles to the traction vehicle, thus relieving the springs and chassis of the traction vehicle from strain.

While in the foregoing there has been shown and described the preferred embodiment of this invention it is to be understood that minor changes in the details of construction, combination and arrangement of parts may be resorted to without departing from the spirit and scope of the invention as claimed.

What is claimed as new is:

A draw bar for a trailer coupling comprising a tongue fixed to the front axle of a traction vehicle, a cross bar secured to the tongue in spaced relation to the front axle, for adjustment longitudinally thereof, a stabilizer bar secured for longitudinal adjustment to the tongue in spaced parallel relation to the cross bar, an extensible side bar pivoted adjacent its forward end to the cross bar adjacent each end thereof, each side bar being coupled through a pin and slot connection to the stabilizer bar, said side bars extending longitudinally of the traction vehicle in a plane below the rear axle thereof, means coupling each side bar to the rear axle of the traction vehicle, a spreader bar extending between the side bars near their rear ends, a vertical arm projecting upwardly from the rear end of each side bar, a tow bar mounted for vertical adjustment on the vertical arms and a trailer coupling fixed to the tow bar intermediate its ends.

ALBERT PARTIN.

REFERENCES CITED

The following references are of record in the file of this patent:

UNITED STATES PATENTS

| Number | Name | Date |
| --- | --- | --- |
| 1,476,647 | Rumsky | Dec. 4, 1923 |
| 2,205,151 | Partin | June 18, 1940 |